May 18, 1965
J. R. KEEN
3,183,975
DE-ICING
Filed Aug. 8, 1963
2 Sheets-Sheet 2
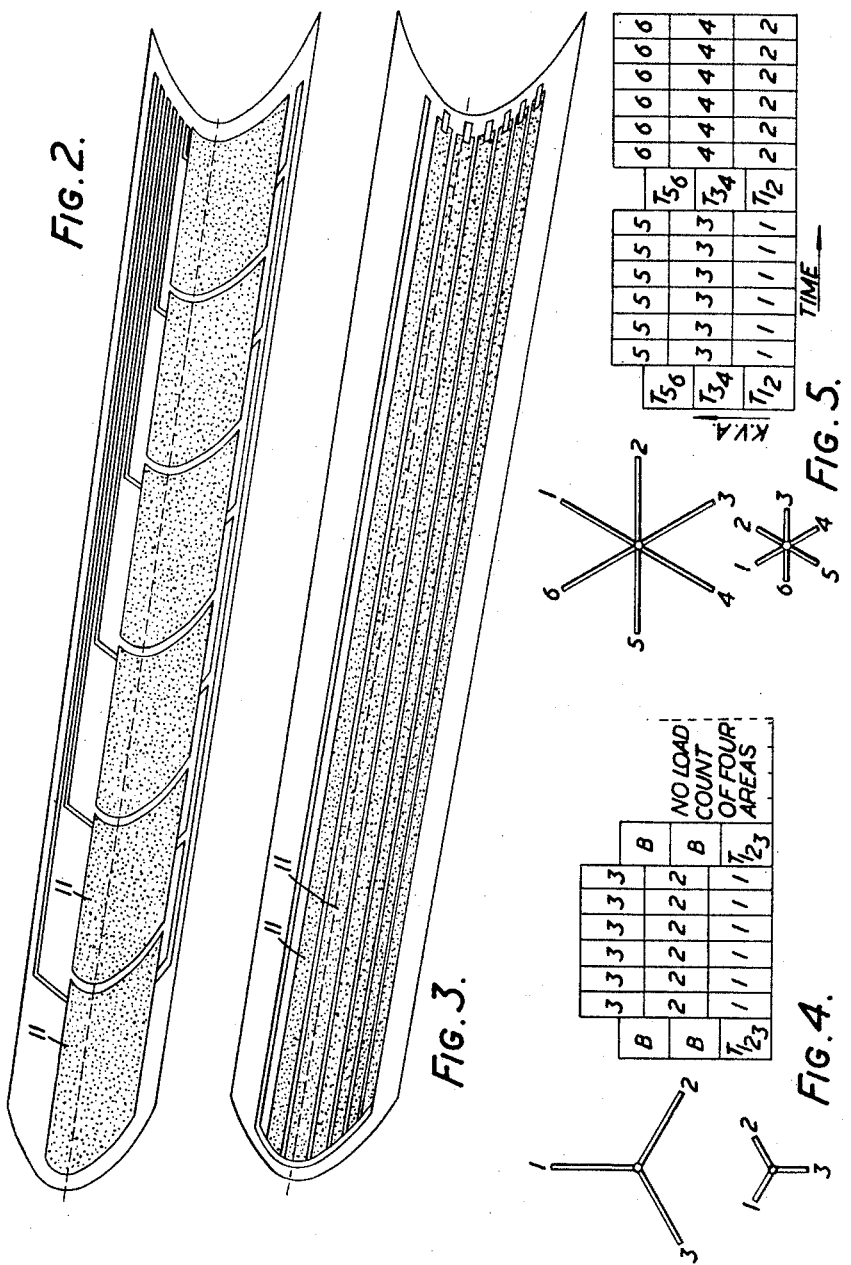
INVENTOR
JOHN R. KEEN
ATTORNEYS United States Patent Office 3,183,975
Patented May 18, 1965

3,183,975
DE-ICING
John Raymond Keen, Luton, England, assignor to D. Napier & Son Limited, London, England, a company of Great Britain
Filed Aug. 8, 1963, Ser. No. 300,780
Claims priority, application Great Britain, Aug. 9, 1962, 30,616/62
4 Claims. (Cl. 170—135.22)

This invention is concerned with de-icing, for example de-icing aircraft control surfaces, where it is desirable to have a heater of as small capacity as possible.

According to the invention, de-icing equipment comprises a number of individual heater distributed over the surfaces from which ice is to be removed—and means for rendering them operative in turn. In this way a heating source of limited capacity can be used for longer periods. The supply will be an electrical supply energizing resistive heaters.

Preferably there is a control of the dwell-time during which each individual heater is operative. It has been found that this time should be increased roughly in proportion to fall in the ambient temperature, and there may be a manual control calibrated in terms of this temperature, or a temperature sensing element may be used in an automatic control.

In one method heat is transferred from one heater to another in response to pulses, and a pulse generator has its frequency determined by this dwell-time control.

A second additional, or alternative, control determines the repetition rate of the whole heating cycle. This control could be automatic, being operated by an ice detector, or being operated by a generator of initiating signals whose frequency is set or present in accordance with the severity of the conditions.

The invention has particular application to controlling de-icing of helicopter blades, because the heating can be performed uniformly by appropriate distribution of the individual heaters.

Moreover, it seems desirable if one rotor—usually the tail rotor—is heated more frequently than the other. Thus if there are more heaters on one surface than on another, the heaters on the other may be energized only when certain of the heaters on the one surface are being energized.

In one form of the invention, each heater on a main motor is arranged to provide two arms of a Δ load on the heater supply, and the heaters are connected in turn on the supply. The heater on the tail rotor is connected as the third arm of the Δ during certain heating periods only in the cycle; during the other periods the third arm of the load is constituted by a ballast resistor.

The invention may be carried into practice in various ways and one embodiment will now be described by way of example as applied to the de-icing of a Westland Wessex helicopter having main and tail rotors, with reference to the accompanying drawings of which:

FIGURE 2 is a diagram showing one way in which individual heaters can be distributed on a main rotor blade;

FIGURE 3 is a diagram showing an alternative way of distributing the heaters;

FIGURE 4 is a diagram indicating the order in which the heaters are energized in a heating cycle for a helicopter having two three-bladed rotors; and FIGURE 5 is a similar diagram for a helicopter having two six-bladed rotors.

Figure 1:
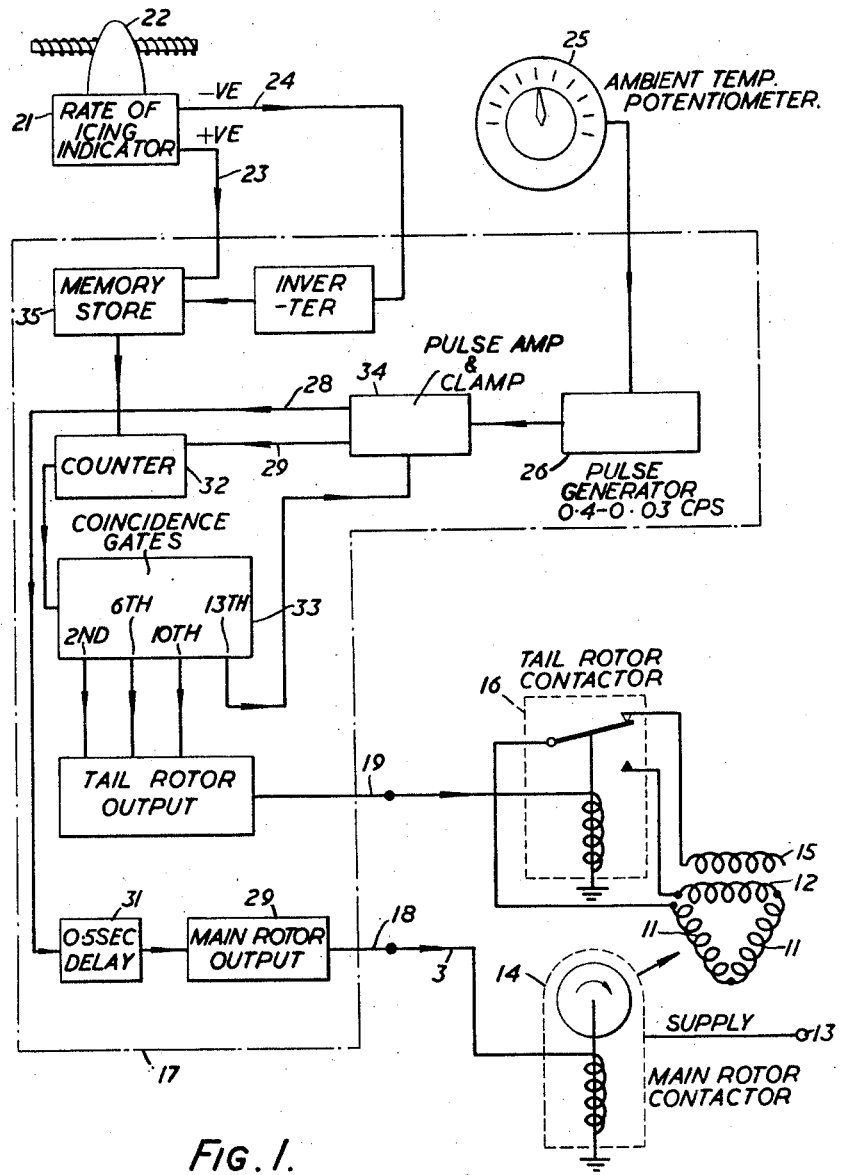
FIGURE 1 is a diagram of the heating control system.

*Arrangement of heaters.*—The main rotor has twelve electric resistance heaters, such as 11, distributed over the rotor blades, and the smaller tail rotor has a single heater 12. All the heaters have the same consumption. They are arranged to be energized in turn in a heating cycle, from 208 volts, 3 phase, electrical supply 13.

The load is a balanced Δ load. Each of the heaters 11 constituted in turn two arms of the Δ, and as a twelve-position rotary contactor 14 moves around, the next heater 11 replaces the previous heater as this part of the load.

During the second, sixth, and tenth, heating periods, the third leg is constituted by the tail rotor heater 12, and during the other nine periods, a ballast resistor 15 replaces it. A change-over contactor 16 controls this.

The contactors 14 and 16 are operated by make-break applications of control potential from a control circuit 17 at 18 and 19 respectively; twelve applications of potential complete a heating cycle. Between heating periods, while the rotor head distributor is working, the supply is interrupted.

The contactors require a 28 volt D.C. supply.

*Control*

A cycle is initiated automatically when an icing indicator 21 indicates that a certain amount of ice has formed. The indicator has a blade 22 with an icing surface, where icing conditions are related to those at the rotor. The indicator is set to give a cycle initiating signal when the ice thickness on the test blade 22 represents an ice thickness of between ⅛" and ¼" at the leading edges of the main rotor blades.

This signal is in the form of a change-over of electrical supply from one output 23 to another 24.

The dwell-time of each heating period in a heating cycle is determined by a potentiometer 25 which is set manually in dependence on the ambient temperature.

*The control circuit 17*

The timing circuit 17 can only accept control signals of positive polarity and an inverter is included in the connection from the line 24, which gives negative signals.

The dwell-time is determined by the frequency of a pulse generator 26, whose frequency can be controlled between limits of 0.4 and 0.03 cycle per second by the setting of the ambient temperature potentiometer 25. The output drives a pulse amplifier stage 34 which isolates the pulse generator from the counter. The pulse amplifier stage also incorporates a voltage clamp stage which is driven by a coincidence gate 33.

The output from the pulse amplifier 34 takes two paths. Path 28 drives a main rotor output relay 29 via a half second delay stage 31. The half second delay is necessary to allow the correct functioning of the rotor head distributor 14 during the change-over from one heated area 12 to the next.

Path 29 drives a four stage counter 32 whose function is to recognize a 12 pulse sequence from the pulse amplifier and provide selected drive for the tail rotor output. Coincidence gates 33 recognize the intervals between pulse 2 and 3, pulse 6 and 7, pulse 10 and 11, and the arrival of the 13th pulse, i.e., the end of the 12th period. During these intervals, the tail contactor 16 is energized, thereby completing the tail rotor heater circuit and open circuiting the ballast resistor 15.

On arrival of the 13th pulse in a sequence the coincidence gate output acts on the voltage clamp in the amplifier 34 and cuts off the pulse generator output from the counter 32. In this condition the counter 32 remains in the 13th or "stop" mode and the main and tail rotor distributors 14 and 16 are de-energized.

On receipt of a further signal from the icing indicator 21 the counter 32 is reset to the beginning of the first mode (the time between pulses 1 and 2), the pulse generator output is restored and the cycle recommences.

Signals from the icing indicator 21 may be received during a heating cycle. In this situation the system does not immediately resort to the beginning of a cycle, but the signal is stored in a memory 35 and a second cycle is initiated immediately on completion of the current cycle. Under these conditions output from the 13th coincidence gate does not operate the voltage clamp, but is used as a sequence starting signal resetting the counter 32 to the first mode, thereby initiating the second cycle.

The memory store 35 has been designed to ignore chatter conditions in the icing indicator, by ensuring that only one pulse received during any heating cycle can be stored. Continuous cycling is therefore possible by the continued receipt of icing signals during each cycle.

The circuit 17 requires a 115 volt 400 c.p.s. 3 phase A.C. power supply.

The potentiometer 25 is arranged to control the pulse generator so that the dwell-time of each heating period increases in proportion as the ambient temperature falls.

The pulse generator 26 is arranged to oscillate at a higher frequency of 5 cycles per second during idling periods when awaiting signals from the icing indicator 21, in order to avoid delays of some seconds between receipt of a signal and commencement of operation of the timer.

Alternatives

Instead of having a manually-set potentiometer 25, it would be possible to control the timer automatically from an ambient air temperature sensing element through a suitable servo system.

Instead of using the icing indicator 21, the timer could be arranged to receive initiating signals automatically after time intervals determined by the setting of a control in dependence upon the severity of the icing conditions.

In one particular alternative design the ice severity meter is omitted and hence the timing unit automatically initiates a de-icing heating sequence immediately power is switched on to the unit. By arranging that each heater is energized for a period of time $(t)$ and then remains de-energized for a further period of time $(T)$ simulation of ice severity meter action is provided.

The ratio $(T)$ to $(t)$ is referred to as the "heat off" to "heat on" cycle ratio and can be varied with the severity of icing. The variation can be done manually. The absence of the ice severity meter avoids the necessity of a memory stage.

If the signals for the pulse generator 26 were required to be at a lower frequency than the generator could provide, a frequency divider could be included at 27.

Distribution of heaters

The distribution of heaters over the rotor blades depends on the characteristics of the particular helicopter, but certain general considerations apply.

In general it is only necessary to protect the outboard part of the length of each main rotor blade, say up to about 75 or 80% of the length. The leading edge is the most important part of the chord to protect together with perhaps 8 to 10% of the upper surface aft of the leading edge and up to 25% of the lower surface.

More heating is required near the root than near the tip and for this purpose the heaters may be arranged to have a power consumption of say 30 watts per square inch at the root reducing in steps to, say, 19 watts per square inch at the tip.

The tail rotor may be protected along the whole length of the lifting surface which might be about 70% of the span; a typical tail rotor blade with a chord of 7.35 inches has a single heater 1 inch wide with a consumption of 22 watts per square inch.

FIGURE 2 shows how six heaters on one main rotor blade can be distributed along the length of the blade and in this case the heaters can be arranged to have successively decreasing power consumptions from root to tip.

FIGURE 3 shows an alternative arrangement in which the heaters are distributed around the chord, there being one heater at the leading edge, one heater aft of this on the upper surface, and four aft of this on the lower surface. These heaters have greater power consumption at their root ends than at their tip ends.

The order in which the various heaters are energized in a heating cycle can be seen from FIGURES 4 and 5.

FIGURE 4 represents a helicopter having a three-bladed main rotor and a three-bladed tail rotor, each main rotor blade having six heaters as indicated in FIGURE 3 and each tail rotor blade having one heater.

In the heating cycle indicated at the right-hand side of FIGURE 4, the first eight heating periods only are used. In the first all three tail rotor heaters are connected in series in one leg of the Δ load and ballast resistors are connected in the other two legs.

In the second to the seventh heating periods, one heater only on each of the three main rotor blades is energized and these are heated in the following order; in the second period the leading edge heaters are energized; in the third, fourth, fifth and sixth periods, the heaters on the underside of the chord are heated starting with the heater nearer the leading edge and working aft, and in the seventh heating period the heaters on the upper side aft of the leading edge are heated.

In the eighth heating period the three tail rotor heaters are again connected in one leg of the Δ while the ballast resistors are connected in the other legs. A scheme for a helicopter having two six-bladed rotors is shown in FIGURE 5. Once again each main rotor blade has six heaters and each tail rotor blade has a single heater.

In this case fourteen heating periods are used. In the first and eighth, two of the tail rotor heaters are connected in series in each leg of the Δ; in the second to the seventh periods, successive heaters on the first, third and fifth rotor blades are energized in the same order as described with reference to FIGURE 4, and in the ninth to fourteenth periods corresponding heaters on the second, fourth and sixth rotor blades.

It will be noticed that in each period of a heating cycle, a balanced Δ load is applied to the supply whether in fact the three legs comprise different heaters or heaters and ballast resistors.

What I claim as my invention and desire to secure by Letters Patent is:

1. De-icing equipment comprising a number of individual electrical resistance heaters distributed over the surfaces from which ice is to be removed, means for energizing the heaters in sequence in a predetermined heating cycle, means responsive to the rate of icing coupled to initiate said predetermined heating cycles, and temperature sensing means responsive to the ambient temperature to determine the dwell time during which each individual heater is operative as a function of the temperature sensed.

2. Equipment as defined in claim 1 wherein the means for energizing the heaters in sequence comprises a counter responsive to input pulses to step through said cycle, a source of the input pulses, and wherein the temperature sensing means produces the dwell time by controlling the frequency of generation of said input pulses.

3. A helicopter having rotor blades and equipment as defined in claim 1 for controlling de-icing of the helicopter's main and tail rotor blades in which individual heaters are distributed over the rotor blades, in which the main rotor has some of the heaters distributed over its blades and means for energizing them in turn, and in which the tail rotor has a heater and means for energizing it only when certain of the heaters on the main rotor are being energized.

4. A helicopter as claimed in claim 3 in which each heater on the main rotor is arranged to provide two arms of a delta load on the heater supply whereas the heater on the tail rotor is connected as the third arm of the delta during certain heating periods in the cycle only.

References Cited by the Examiner
UNITED STATES PATENTS

| | | | |
|---|---|---|---|
| 2,552,075 | 5/51 | Von Daam | 244—134 |
| 2,625,661 | 1/53 | Hayden | 244—134 |
| 2,675,456 | 4/54 | Cleminson et al. | 244—134 |
| 2,774,552 | 12/56 | Glad | 244—134 X |
| 3,002,718 | 10/61 | Hackenberger | 244—134 |

FOREIGN PATENTS

| | | |
|---|---|---|
| 756,529 | 9/56 | Great Britain. |

JULIUS E. WEST, *Primary Examiner.*